US006826471B2

(12) United States Patent
Daudel et al.

(10) Patent No.: US 6,826,471 B2

(45) Date of Patent: Nov. 30, 2004

(54) METHOD FOR DETERMINING NITROGEN OXIDE CONTENT IN INTERNAL COMBUSTION ENGINE EXHAUST GASES CONTAINING OXYGEN

(75) Inventors: Helmut Daudel, Schorndorf (DE); Guenther Hohenberg, Darmstadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/363,321

(22) PCT Filed: Aug. 28, 2001

(86) PCT No.: PCT/EP01/09870

§ 371 (c)(1), (2), (4) Date: Aug. 15, 2003

(87) PCT Pub. No.: WO02/18762

PCT Pub. Date: Mar. 7, 2002

(65) Prior Publication Data

US 2004/0050362 A1 Mar. 18, 2004

(30) Foreign Application Priority Data

Sep. 2, 2000 (DE) ........................................ 100 43 383

(51) Int. Cl.[7] ................................................ G06F 19/00

(52) U.S. Cl. ....................... 701/114; 701/109; 701/115; 123/435; 123/673; 123/679; 73/115; 60/274; 60/276; 60/277; 60/278

(58) Field of Search ................................ 701/103, 108, 701/106, 109, 114, 115; 123/90.11, 435, 673, 679; 60/274, 276–278; 73/115

(56) References Cited

U.S. PATENT DOCUMENTS 4,439,137 A * 3/1984 Suzuki et al. .................. 431/8
4,556,030 A 12/1985 Aono
5,219,227 A 6/1993 Yang et al.
5,698,776 A 12/1997 Tomisawa
5,854,990 A 12/1998 Reckzuegel et al.
5,956,948 A 9/1999 Nagashima et al.
6,467,256 B2 * 10/2002 Hashimoto .................. 60/277
6,484,493 B2 * 11/2002 Takanohashi ................ 60/277

FOREIGN PATENT DOCUMENTS

DE 195 20 605 5/1996
DE 196 06 680 8/1996
DE 197 05 463 8/1998
DE 198 01 626 7/1999
EP 0 783 918 7/1997

OTHER PUBLICATIONS

German Office Action.
International Search Report.
English Language Abstract of JP 58 013137.
English Language Abstract of JP 06 108903.

* cited by examiner

*Primary Examiner*—Willis R. Wolfe
*Assistant Examiner*—Johnny H. Hoang
(74) *Attorney, Agent, or Firm*—Crowell & Moring LLP

(57) ABSTRACT

An operating internal combustion engine with at least one cylinder (2), and a piston (12), which can move in an alternating manner therein, is used to compress a fuel mix in a combustion chamber (11). In order to determine the nitrogen oxide content in oxygen-containing exhaust gases, the quantity of fuel fed to the cylinder (2) and the air mass flowing in an induction pipe (15) are recorded and are fed to an electronic circuit (6). The center of gravity (S) of the combustion is determined from at least one current measured value for the engine operation, and the level of nitrogen oxide emissions is calculated from the value for the center of gravity (S) of the combustion, including the values for the recorded fuel quantity and air mass.

8 Claims, 3 Drawing Sheets

METHOD FOR DETERMINING NITROGEN OXIDE CONTENT IN INTERNAL COMBUSTION ENGINE EXHAUST GASES CONTAINING OXYGEN

This application claims the priority of PCT International Application No. PCT/EP01/09870 filed Aug. 28, 2001 and German Patent Document No. 101 43 383.9, filed Sep. 2, 2000, the disclosures of which are expressly incorporated by reference herein.

BACKGROUND AND SUMMARY OF THE INVENTION

The invention relates to a method for determining the nitrogen oxide content in oxygen-containing exhaust gases from internal combustion engines.

When internal combustion engines are operating, exhaust gases which contain various pollutants are formed, The levels of these pollutants are dependent substantially on the composition of the fuel/air mix. Particularly in the case of operation with a lean fuel/air mix, i.e. lambda>1, the level of nitrogen oxides ($NO_x$) is high. To ensure that the exhaust emissions regulations, which are in some countries highly stringent, can be observed, it is known to use $NO_x$ storage catalytic converters. However, despite being regenerated during certain operating conditions, these $NO_x$ storage catalytic converters have only a limited storage capacity, and consequently it is not always possible to store sufficient amounts of the nitrogen oxides produced.

To combat this problem, German Patent DE 198 01 626 A1 has already proposed a method for diagnosis of a catalytic converter in the exhaust gas from internal combustion engines which has a capacity to store both oxygen and nitrogen oxides. In this method, it is provided that a first phase shift between a lowering of the oxygen concentration and a subsequent reaction of the sensor and a second phase shift between a subsequent increase in the oxygen concentration and a following reaction of the sensor are recorded. In this method, the difference in the phase shift is determined and a fault signal is stored and/or emitted if the said difference does not reach a predetermined threshold. With this method, it is not possible to influence the operation of the internal combustion engine and the level of nitrogen oxides in the exhaust gas formed during combustion.

European Patent EP 0 783 918 A1 discloses a method for lowering the nitrogen oxide content in oxygen-containing exhaust gases from internal combustion engines, in particular from diesel engines and direct-injection spark-ignition engines for motor vehicles. In this method, the nitrogen oxides are reduced by a catalytic converter with the aid of a reducing agent which is metered to the exhaust gas as a function of operating parameters. The reducing agent used is hydrogen and/or hydrocarbon, with only hydrogen being fed to the exhaust gas upstream of the catalytic converter in a first operating mode of the internal combustion engine. Both, hydrogen and hydrocarbon are fed to the exhaust gas upstream of the catalytic converter in a second operating mode and only hydrocarbon is fed to the exhaust gas upstream of the catalytic converter in a third operating mode. In this case too, it is not possible to influence the way in which the internal combustion engine operates with regard to the formation of the nitrogen oxide fraction.

The invention is therefore based on the object of providing a method for determining the nitrogen oxide content in oxygen-containing exhaust gases from internal combustion engines, by means of which it is possible to determine the nitrogen oxide emissions on the basis of the variables which actually have an influence.

This object is achieved by a method for determining the nitrogen oxide content in oxygen-containing exhaust gases from internal combustion engines.

In the development of internal combustion engines with fuel injection, it has already been attempted for some time to determine the nitrogen oxide emissions ($NO_x$ emissions) by calculation. Achieving this determination would help, for example, to precalculate the $NO_x$ emissions and with test planning and also with plausibility checks of measured values, such as indexing data and $NO_x$ values. However, the current simulation models which are used to determine the $NO_x$ emissions by calculation are altogether inadequate. Moreover, due to the extremely high demand for calculation time, these calculation models are unable to form a control algorithm for use in vehicles.

This problem is also of particular importance in connection with the use of SCR catalytic converters. The quantity of urea to be injected for a catalytic converter of this type is in a fixed ratio to the $NO_x$ emissions. From this, it can be concluded that correspondingly accurate metering of the urea is possible as a function of the accuracy with which the $NO_x$ emissions can be determined, and therefore the efficiency of the catalytic converter can be increased.

The present invention makes it possible to precisely calculate the $NO_x$ emissions, since this calculation is based on values from the variables which actually have an influence on the $NO_x$ emissions. The level of the $NO_x$ emissions from an internal combustion engine is dependent primarily on the local temperature, the oxygen concentration and the residence time of the cylinder charge in the combustion chamber. The two latter variables can be recorded relatively easily by measuring the engine speed of the air used and also the fuel quantity. On other hand, it is much more difficult to determine the gas temperature in the combustion chamber. The present invention therefore proposes using a different variable which is directly linked to the gas temperature which is of relevance to the formation of nitrogen oxides. Since the gas temperature is decisively dependent on the center of gravity of the combustion, i.e. the position where 50% of the fuel is converted in relation to the piston position TDC, it is advantageous to select the center of gravity or a similar variable, such as for example the position of the maximum energy conversion, as a reference variable for the $NO_x$ emissions. The level of the $NO_x$ emissions is calculated from this value for the center of gravity of the combustion and the values of the recorded fuel quantity and air mass, for example with the aid of neural networks.

The determination of the center of gravity of the combustion is preferably effected by measuring the combustion-chamber pressure profile. For this purpose, a pressure sensor is provided in the region of the combustion chamber. This manner of determining the center of gravity of the combustion is extremely precise. Alternatively, it is also possible to use a dedicated model for calculating the center of gravity from the start of injection to determine the center of gravity of the combustion.

If there are pressure sensors for determining the center of gravity of the combustion, there are also further advantages, in particular with regard to the monitoring of the maximum pressure for fault detection, for establishing the operating mode and the like.

In a further configuration of the invention, it is advantageous if the quantity of recirculated exhaust gas is recorded by means of a sensor and a corresponding signal is fed to the electric circuit, then this signal can be included in the calculation of the level of the $NO_x$ emissions. Furthermore, it is advantageous if the oxygen concentration in the exhaust gas is recorded and a corresponding signal is fed to the electric circuit and if this signal is included in the calculation of the level of the $NO_x$ emissions. To monitor all the cylinders and to carry out a comparison of the corresponding pressure profiles for the purpose of fault detection, it is advantageous for a pressure sensor to be arranged in each cylinder, so that the pressure profile in the combustion chamber is recorded in each cylinder, and a separate calculation of the $NO_x$ emissions takes place for each cylinder.

Furthermore, in the case of fast-running internal combustion engines, it is expedient for the rotational speed of the internal combustion engine to be recorded and for a corresponding signal to be fed to the electric circuit, and for this signal to be included in the calculation of the level of the $NO_x$ emissions. Moreover, it is expedient to provide an $NO_x$ sensor which records the $NO_x$ content in the exhaust-gas stream, the resulting measured value being compared with the level of the calculated $NO_x$ emissions.

BRIEF DESCRIPTION OF THE DRAWINGS

The invention is explained in more detail below with reference to the drawings, in which.

DETAILED DESCRIPTION OF THE PREFERRED EMBODIMENT

Figure 1:
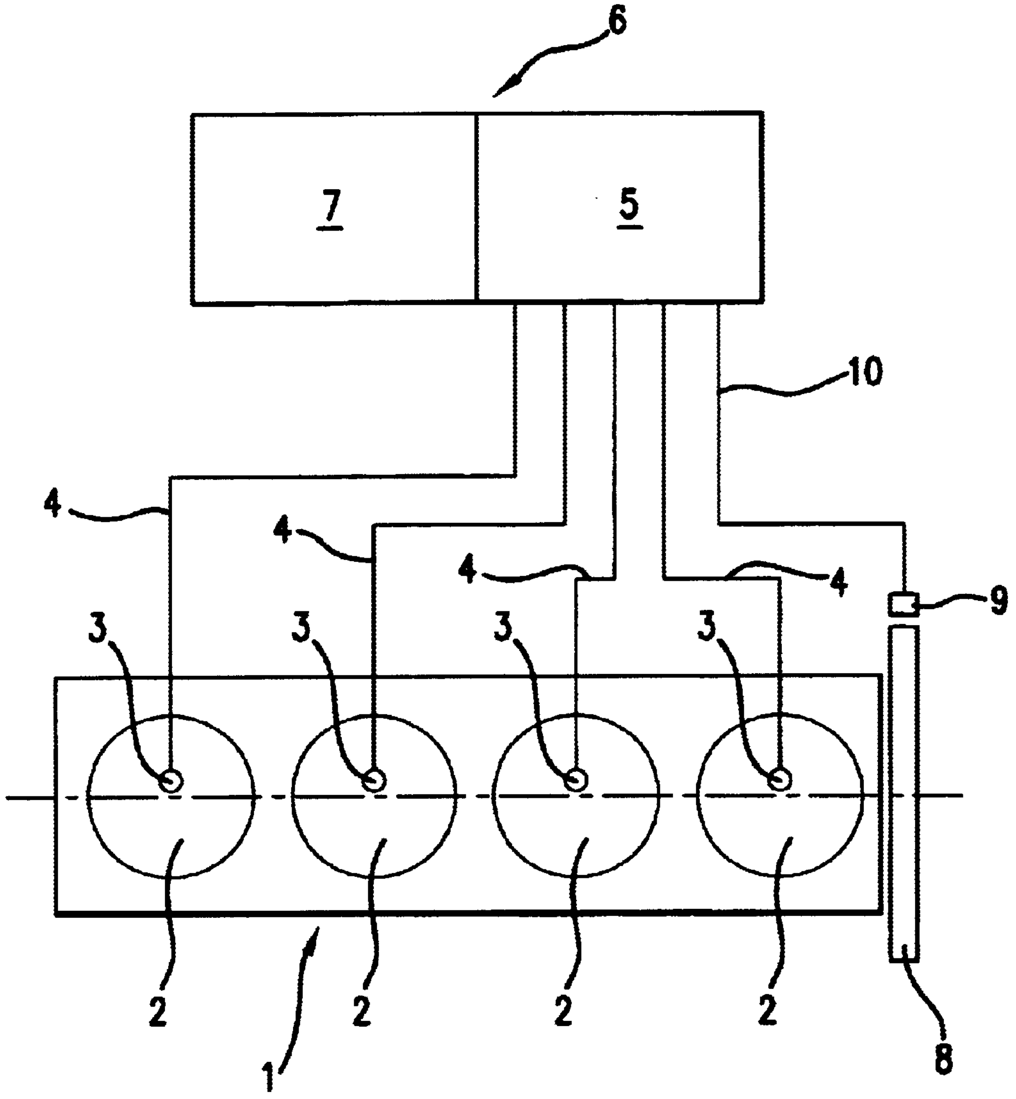
FIG. 1 diagrammatically depicts an engine block with pressure sensors and engine electronics, FIG. 2 diagrammatically depicts a vertical section through an internal combustion engine with fuel and air feed.

FIG. 1 illustrates a cylinder block 1 which comprises four cylinders 2. Each of the cylinders is assigned a pressure sensor 3 located in the region of the combustion chamber. These pressure sensors 3 are connected to inputs of a signal preparation circuit 5 by means of connecting lines 4. The signal preparation circuit 5 is part of an electronic circuit 6 which also includes engine electronics 7. A disk 8, which, by way of example, may simultaneously form the flywheel, is arranged on a crankshaft (not shown in the drawing) of the internal combustion engine, this disk 8 being assigned an angle mark transmitter 9. This angle mark transmitter 9 is connected via a line 10 to an input of the signal preparation circuit 5.

Figure 2:
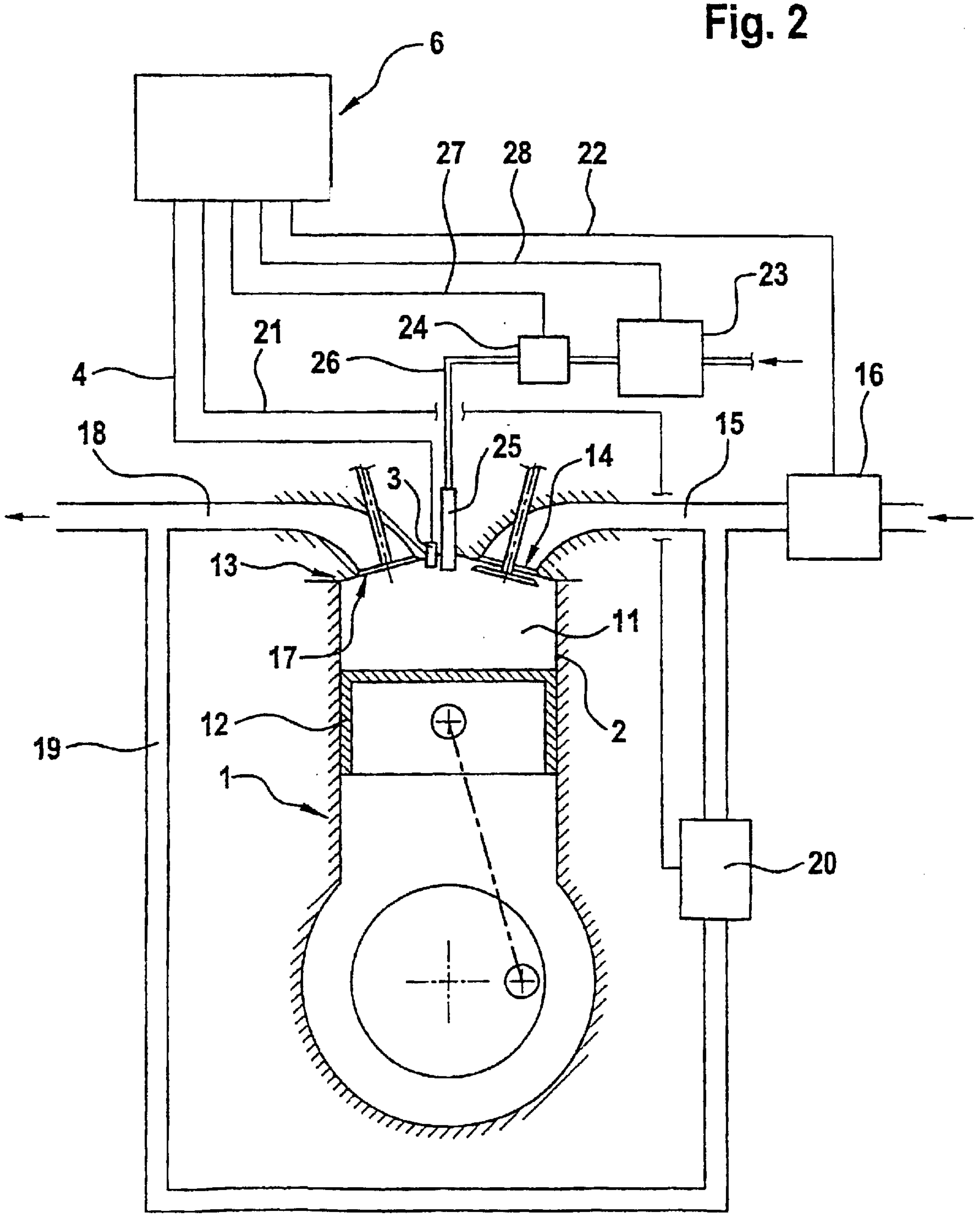

FIG. 2 diagrammatically depicts the cylinder block 1 as a longitudinal section through the cylinder 2, a piston 12 being guided displaceably in the cylinder 2, the top side of the piston 12 delimiting a combustion chamber 11. At its top side, the cylinder 2 is closed off by a cylinder head 13, an intake valve 14 and an exhaust valve 17 being arranged in the cylinder head 13. The required combustion air can flow into the cylinder 2 from the induction pipe 15 through the intake valve 14, the corresponding air mass being recorded in an air mass flow meter 16. The air mass flow meter 16 is connected to the electronic circuit 6 via a line 22.

The combustion gases pass through the exhaust valve 17 into an exhaust pipe 18, which leads to a catalytic converter arrangement, which is not shown in the drawing. An exhaust-gas recirculation line 19, which branches off from the exhaust pipe 18 and opens out into the induction pipe 15 downstream of the air mass flow meter 16, is provided. In this exhaust-gas recirculation line 19 there is a quantitative recirculation sensor 20, which records the mass of exhaust gas recirculated and transmits corresponding signals via a sensor line 21 to the electronic circuit 6.

The pressure sensor 3, which has already been described in connection with FIG. 1, is arranged in the cylinder head 13 and connected to the electronic circuit 6 via the connecting line 4. Moreover, around the cylinder head 13 there is an injection valve 25, which is connected to an injection pump 23 via an injection line 26. Between the injection pump 23 and the injection valve 25 there is a measuring device 24 for measuring the fuel mass. This measuring device 24 is connected via an electric line 27 to the circuit 6, and the injection pump 23 is provided with a control line 28, the other end of which lies at the circuit 6.

Figure 3:
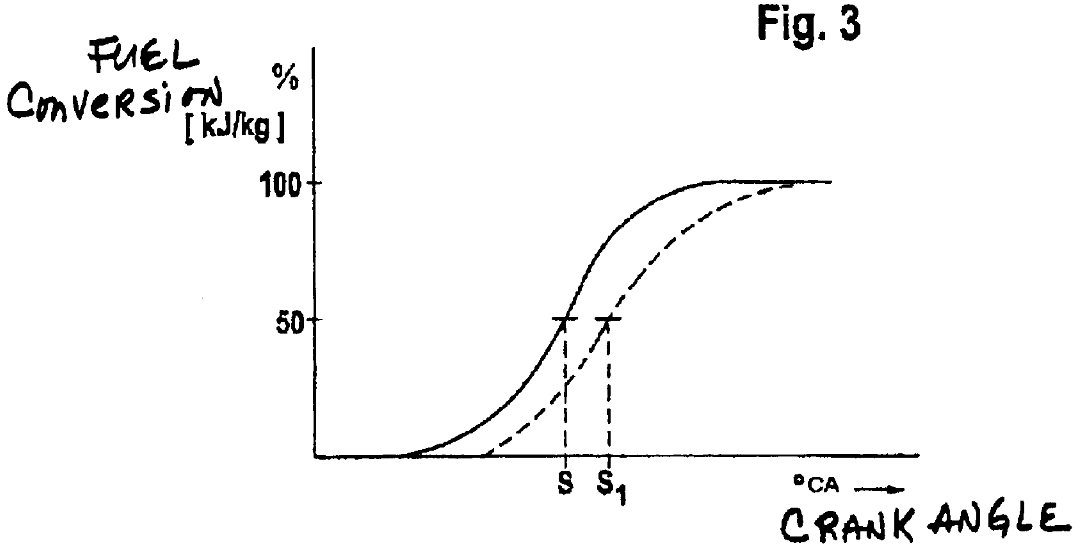
FIG. 3 illustrates the profile of the combustion and position of the center of gravity, based on the crank angle.

The device described in FIGS. 1 and 2 makes it possible to use the pressure sensor 3 to measure the pressure profile in the combustion chamber 11. The center of gravity S of the combustion can be determined from the pressure profile, the position of the center of gravity lying at 50% of the conversion of the fuel. This relationship corresponds to the first law of thermodynamics dQ=dU+dW, i.e. the energy supplied is equal to the internal energy plus the piston work. The position of the center of gravity S changes with respect to the crank angle (CA) when the combustion profile changes, as illustrated in FIG. 3. The center of gravity S is located where 50% of the energy supplied has been converted. The dashed line in FIG. 3 illustrates that, with a changed combustion profile, for example resulting from a later start of injection, the position of the center of gravity also changes, as indicated by $S_1$ in FIG. 3.

Figure 4:
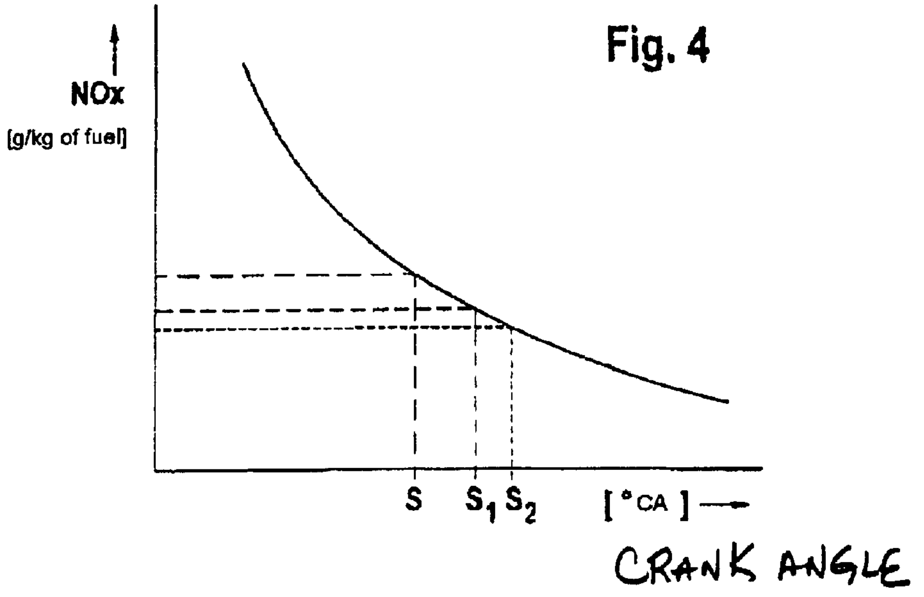
FIG. 4 illustrates the way in which the nitrogen oxide emissions are dependent on the position of the center of gravity, based on the crank angle.

The fact that the position of the center of gravity S of the combustion has direct effects on the nitrogen oxide emissions $NO_x$ is clearly illustrated by FIG. 4 from which it can be seen that the $NO_x$ emissions in g/kg of fuel increases as the crank angle at which the center of gravity S is reached decreases. Therefore, the result is lower $NO_x$ values for later crank angles and their center of gravity $S_1$ or $S_2$.

The present invention can be used to monitor the peak pressure $P_{max}$ and its position, based on the crank angle. Furthermore, it is possible to carry out monitoring with regard to the uniformity of combustion in the indexed cylinders. Furthermore, it is possible to use an additional $NO_x$ sensor for system redundancy, in which case the measured value can be compared with the calculated value for $NO_x$. The values determined for $NO_x$ can be used to control and regulate exhaust-gas aftertreatment systems. The present invention is suitable not only for carrying out tests in test stands but also in particular for use in vehicles, i.e. for what is known as on-board diagnosis constant calculation and monitoring of the $NO_x$ emissions is possible.

What is claimed is:

1. A method for determining the nitrogen oxide content in oxygen-containing exhaust gases from internal combustion engine having at least one cylinder, and a corresponding at least one piston wherein each piston moves in an alternating manner in a corresponding each cylinder, said method comprising the steps of;

providing a fuel mix in a combustion chamber;

recording an indication of a quantity of fuel fed to each said at least one cylinder and an air mass flowing in an induction pipe;

feeding said indication to an electronic circuit;

providing at least one current measured value for operation of the engine;

determining the center of gravity (S) of a combustion from said at least one current measured value;

calculating a level of nitrogen oxide emissions from a value for the determined center of gravity (S) of the combustion and from values indicating the recorded fuel quantity and air mass.

2. The method according to claim 1, further comprising the steps of;

recording, by means of a sensor, a pressure profile in the combustion chamber and providing a signal output;

feeding said signal output, which corresponds to the pressure profile, to said electronic circuit;

determining the center of gravity (5) of the combustion from said signal said to the electronic circuit.

3. The method according to claim 1, wherein a calculation model is stored in an engine electronics part of the electronic circuit and wherein said calculation mode calculates a position of maximum energy conversion from the center of gravity (S) of the combustion from a current time of starting of the injection.

4. The method according to claim 1, including the steps of recording the quantity of recirculated exhaust gas by means of sensor and feeding said quantity to the electronic circuit, wherein said quantity is one of the functions used in a calculation of the level of $NO_x$ emissions.

5. The method according to claim 1, further including the step of recording oxygen concentration and outputting a corresponding signal to said electronic circuit, wherein said signal is included as a function in the calculation of the level of the $NO_x$ emissions.

6. The method according to claim 1, further comprising the step of recording, in each cylinder, a pressure profile in the combustion chamber and carrying out a separate calculation of the $NO_x$ emissions for each one of said at least one cylinder.

7. The method according to claim 1, including the steps of:

recording the $NO_x$ content in the exhaust gas stream by means of a $NO_x$ sensor; and comparing said recorded $NO_x$ content with the calculated $NO_x$ emissions.

8. The method according to claim 1, further comprising the steps of:

recording a rotational speed of the internal combustion engine; and feeding a corresponding signal to the electronic circuit wherein said fed signal is included in the calculation of the level of the $NO_x$ emissions.

* * * * *